(12) United States Patent
Oishi et al.

(10) Patent No.: US 9,931,900 B2
(45) Date of Patent: Apr. 3, 2018

(54) AIR SUSPENSION SYSTEM

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Masaaki Oishi, Takahama (JP); Hideki Ohashi, Chiryu (JP); Jun Tokumitsu, Toyota (JP); Ryo Kanda, Nissin (JP)

(73) Assignees: AISIN SEIKI KABUSHIKI KAISHA, Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 15/605,486

(22) Filed: May 25, 2017

(65) Prior Publication Data

US 2017/0341480 A1 Nov. 30, 2017

(30) Foreign Application Priority Data

May 31, 2016 (JP) .................................. 2016-108629

(51) Int. Cl.
*B60G 17/044* (2006.01)
*B60G 11/30* (2006.01)
*B60G 11/27* (2006.01)

(52) U.S. Cl.
CPC .............. *B60G 11/30* (2013.01); *B60G 11/27* (2013.01); *B60G 2204/30* (2013.01); *B60G 2500/205* (2013.01)

(58) Field of Classification Search
CPC .... B60G 21/073; B60G 17/044; B60G 21/06; B60G 21/067; B60G 17/017;
(Continued)

(56) References Cited

U.S. PATENT DOCUMENTS

| 4,593,931 A | * | 6/1986 | Shiratori | B60G 17/04 180/41 |
| 4,836,575 A | * | 6/1989 | Buma | B60G 17/033 280/124.157 |

(Continued)

FOREIGN PATENT DOCUMENTS

| JP | 3-070615 A | 3/1991 |
| JP | 2015-098792 A | 5/2015 |

OTHER PUBLICATIONS

U.S. Appl. No. 15/436,390, filed Feb. 17, 2017.

*Primary Examiner* — Toan C To
(74) *Attorney, Agent, or Firm* — Buchanan Ingersoll & Rooney PC (57) ABSTRACT

An air suspension system includes a controller that controls opening/closing of normally-closed electromagnetic switching valves constituting a control valve, a first supply/discharge switching valve, a second supply/discharge switching valve, a first tank switching valve, and a second tank switching valve. The controller controls opening/closing of the electromagnetic switching valves in an order of first control, second control, and third control. In the first control, the control valve is opened. In the second control, the first supply/discharge switching valve and the second supply/discharge switching valve are opened in an opened state of the control valve. In the third control, the control valve, the first supply/discharge switching valve, and the second supply/discharge switching valve are closed.

5 Claims, 5 Drawing Sheets

(58) Field of Classification Search
CPC ............ B60G 17/0525; B60G 17/0565; B60G 17/056; B60G 17/0523; B60G 2500/302; B60G 2500/202; B60G 2500/2021; B60G 2800/20; B60G 2800/202; B60G 2202/152; B60G 2400/202; B60G 2400/252
USPC ....... 280/124.157, 124.158, 124.159, 124.16
See application file for complete search history.

(56) References Cited

U.S. PATENT DOCUMENTS

| | | | | |
|---|---|---|---|---|
| 4,858,895 | A * | 8/1989 | Buma | .................... B60G 17/04 267/64.16 |
| 9,168,806 | B2 * | 10/2015 | Kondo | ................. B60G 21/073 |
| 9,758,007 | B2 * | 9/2017 | Kondo | ............... B60G 17/0565 |
| 2006/0006733 | A1 * | 1/2006 | Geiger | ............... B60G 17/0157 303/3 |
| 2006/0049606 | A1 * | 3/2006 | Geiger | ............... B60G 17/0155 280/124.157 |
| 2015/0151600 | A1 * | 6/2015 | Suzuki | ................. B60G 17/017 280/5.514 |
| 2015/0151603 | A1 * | 6/2015 | Kondo | ................. B60G 17/017 280/6.157 |

* cited by examiner

AIR SUSPENSION SYSTEM

INCORPORATION BY REFERENCE

The disclosure of Japanese Patent Application No. 2016-108629 filed on May 31, 2016 including the specification, drawings and abstract is incorporated herein by reference in its entirety.

BACKGROUND

1. Technical Field

The disclosure relates to an air suspension system and, in particular, to an air suspension system of a so-called closed type.

2. Description of Related Art

Various configurations have been known for an air suspension system that adjusts vehicle height by controlling a supply and discharge of air to/from an air spring device attached to each wheel of the vehicle. The air suspension system of a so-called closed type is disclosed, for example, in FIG. 9 of Japanese Patent Application Publication No. 2015-98792 (JP 2015-98792 A), which will be described below, and details thereon are described in paragraphs [0026] to [0032] of the document.

SUMMARY

The above air suspension system of the closed type includes: an air spring device that is attached to each of the wheels of the vehicle and has an air chamber; a compressor that has a discharge port and a back-pressure introduction port, compresses the air, and discharges the compressed air from the discharge port; a pressure accumulator tank that accumulates the air; a control valve that is disposed in a supply/discharge path, through which the discharge port of the compressor communicates with the air chamber; a first supply/discharge switching valve that is disposed in a supply/discharge path between the control valve and the compressor; a first tank switching valve that is disposed in a supply/discharge path between the pressure accumulator tank and the discharge port of the compressor; a second supply/discharge switching valve and a second tank switching valve that are disposed in a supply/discharge path between the control valve and the pressure accumulator tank; a circulation path, through which a portion between the second supply/discharge switching valve and the second tank switching valve communicates with the back-pressure introduction port of the compressor; and a controller that controls opening/closing of the control valve, the first and second supply/discharge switching valves, and the first and second tank switching valves. As a normally-closed electromagnetic switching valve, a solenoid valve of a so-called poppet type is used for each of the control valve, the switching valves, which are described above, and the like.

In the above air suspension system, a capacity of each of the paths (piping) that communicate with the control valve, the switching valves, which are described above, and the like is much smaller than capacities of the air spring device and the pressure accumulator tank. In addition, each component is usually filled with high-pressure fluid (compressed air). Thus, for example, when such components remain unused for a long period, the fluid (the compressed air) is leaked from a portion sealed by a sealing member, such as a joined portion of the electromagnetic switching valve with the path, which results in a reduction of pressure. In particular, a magnitude of the reduction of the pressure is extremely greater for the path with the small capacity than for the air spring device and the pressure accumulator tank, which causes a significant pressure difference before and after the electromagnetic switching valve. In such a situation, that is, in a situation where the significant pressure difference occurs before and after the electromagnetic switching valve, an amount of energy (suction power) that is required to switch the electromagnetic switching valve from a closed position to an open position is significantly increased, and thus a valve opening operation becomes difficult. To make matters worse, a voltage of a battery as an energy source has been reduced because the system remains unused for the long period. This makes the valve opening operation of the electromagnetic switching valve even more difficult, and execution of vehicle height adjustment control is possibly inhibited before a travel start.

In view of the above, the disclosure provides an air suspension system of a so-called closed type that reduces a pressure difference before and after an electromagnetic switching valve as much as possible and thereby secures an appropriate and smooth valve opening operation.

An air suspension system according to an aspect of the disclosure includes: an air spring device that is attached to each wheel of a vehicle and has an air chamber; a compressor that has a discharge port and a back-pressure introduction port, compresses air, and discharges the compressed air from the discharge port; a pressure accumulator tank that accumulates the air; a control valve that is disposed in a supply/discharge path through which the discharge port of the compressor communicates with the air chamber; a first tank switching valve that is disposed in a supply/discharge path between the pressure accumulator tank and the discharge port of the compressor; a first supply/discharge switching valve that is disposed in a supply/discharge path between the first tank switching valve and the control valve; a second supply/discharge switching valve that is disposed in a supply/discharge path between the control valve and the pressure accumulator tank; a second tank switching valve that is disposed in a supply/discharge path between the second supply/discharge switching valve and the pressure accumulator tank; a circulation path through which a portion between the second supply/discharge switching valve and the second tank switching valve communicates with the back-pressure introduction port of the compressor; and a controller that controls opening/closing of normally-closed electromagnetic switching valves that constitute the control valve, the first supply/discharge switching valve, the second supply/discharge switching valve, the first tank switching valve, and the second tank switching valve. The air suspension system adjusts vehicle height by controlling a supply/discharge of the air to/from the air spring device. The controller controls opening/closing of each of the electromagnetic switching valves in an order of first control, second control, and third control. In the first control, the control valve is opened such that pressure in a supply/discharge path between the control valve and each of the first supply/discharge switching valve and the second supply/discharge switching valve equals pressure in the air chamber. In the second control, the first supply/discharge switching valve and the second supply/discharge switching valve are opened in an opened state of the control valve such that pressure before each of the first supply/discharge switching valve and the second supply/discharge switching valve equals pressure after each thereof. In the third control, the control valve, the first supply/discharge switching valve, and the second supply/discharge switching valve are closed.

In the above aspect, the air spring device may have: a front-wheel side air chamber that is attached to each of the wheels in a front portion of the vehicle; a rear-wheel side air chamber that is attached to each of the wheels in a rear portion of the vehicle; a front-wheel side supply/discharge path that communicates with each of the front-wheel side air chambers; and a rear-wheel side supply/discharge path that communicates with each of the rear-wheel side air chambers. The control valve may have: a front-wheel side control valve that is attached to each of the front-wheel side supply/discharge paths; and a rear-wheel side control valve that communicates with each of the rear-wheel side supply/discharge paths. The first control by the controller may be configured by including: rear-wheel side control in which the rear-wheel side control valve is opened such that the pressure in the supply/discharge path between the rear-wheel side control valve and each of the first supply/discharge switching valve and the second supply/discharge switching valve equals pressure in the rear-wheel side air chamber; and front-wheel side control in which the front-wheel side control valve is opened after the rear-wheel side control valve is closed such that the pressure in the supply/discharge path between the front-wheel side control valve and each of the first supply/discharge switching valve and the second supply/discharge switching valve equals pressure in the front-wheel side air chamber.

In the above aspect, the air suspension system further includes: a first measurement section that measures an elapsed period after a stop of the vehicle; a second measurement section that measures pressure in the pressure accumulator tank; and a third measurement section that measures pressure in the supply/discharge path. The controller may execute the first to third control when specified number of days or longer has elapsed since the stop of the vehicle, the pressure in the pressure accumulator tank exceeds specified tank pressure, and the pressure in the supply/discharge path is lower than specified path pressure at least on the basis of measurement results of the first to third measurement sections. Furthermore, in the above configuration, the air suspension system further includes a fourth measurement section that measures a voltage for driving the electromagnetic switching valves. The controller may execute the first to third control when the specified number of days or longer has elapsed since the stop of the vehicle, the pressure in the pressure accumulator tank exceeds the specified tank pressure, the pressure in the supply/discharge path is lower than the specified path pressure, and the voltage for driving the electromagnetic switching valves is lower than a specified voltage on the basis of measurement results of the first to fourth measurement sections. Moreover, in the above configuration, the air suspension system further includes a fifth measurement section that measures temperatures around the electromagnetic switching valves. The controller may set the specified voltage in accordance with a measurement result of the fifth measurement section.

Due to the above-described configuration, the disclosure exerts the following effects. In the above air suspension system, the controller, which controls opening/closing of the normally-closed electromagnetic switching valves constituting the control valve, the first and second supply/discharge switching valves, and the first and second tank switching valves, is configured to control opening/closing of the electromagnetic switching valves in the order of the first control, in which the pressure in the supply/discharge path between the control valve and each of the first and second supply/discharge switching valves equals the pressure in the air chamber when the control valve is switched to an open position, the second control, in which the pressure before each of the first and second supply/discharge switching valves equals the pressure after each thereof when the first and second supply/discharge switching valves are at the open positions in a state where the control valve is at the open position, and in the third control, in which the control valve and the first and second supply/discharge switching valves are switched to the closed positions. Accordingly, a pressure difference before and after each of the electromagnetic switching valves can be reduced as much as possible, and an appropriate and smooth valve opening operation can thereby be secured. Therefore, vehicle height adjustment control can reliably be executed after a travel start without enlarging the above electromagnetic switching valves, a battery, and the like.

In particular, the first control by the controller is configured by including: the rear-wheel side control, in which the pressure in the supply/discharge path between the rear-wheel side control valve and each of the first and second supply/discharge switching valves equals the pressure in the rear-wheel side air chamber when the rear-wheel side control valve is switched to the open position; and the front-wheel side control, in which the pressure in the supply/discharge path between the front-wheel side control valve and each of the first and second supply/discharge switching valves equals the pressure in the front-wheel side air chamber when the front-wheel side control valve is switched to the open position after the rear-wheel side control valve is switched to the closed position. In such a case, the rear-wheel side control can preferentially be executed on the rear-wheel side control valve, valve opening pressure of which is generally low, among the control valves that are disposed in the front and rear wheels of the vehicle. Therefore, the further smooth valve opening operation can be secured.

The above air suspension system further includes the first to third measurement sections. The first to third control are executed when the specified number of days or longer has elapsed since the stop of the vehicle, the pressure in the pressure accumulator tank exceeds the specified tank pressure, and the pressure in the supply/discharge path is lower than the specified path pressure. In such a case, control before the travel start, which is required for each of the electromagnetic switching valves, can appropriately be determined, and the smoothing valve opening operation can thereby be secured. Furthermore, the above air suspension system further includes the fourth measurement section. In such a case, the first to third control can be executed when the voltage for driving the electromagnetic switching valves is lower than the specified voltage in addition to the above. Thus, necessity of the control before the travel start can reliably be determined. Moreover, the above air suspension system further includes the fifth measurement section that measures the temperatures around the electromagnetic switching valves, and is configured to set the above specified voltage in accordance with the measurement result. In such a case, a change in the required voltage to drive the electromagnetic switching valves, which is associated with a temperature change, is appropriately handled, and thus the necessity of the control before the travel start can further reliably be determined.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
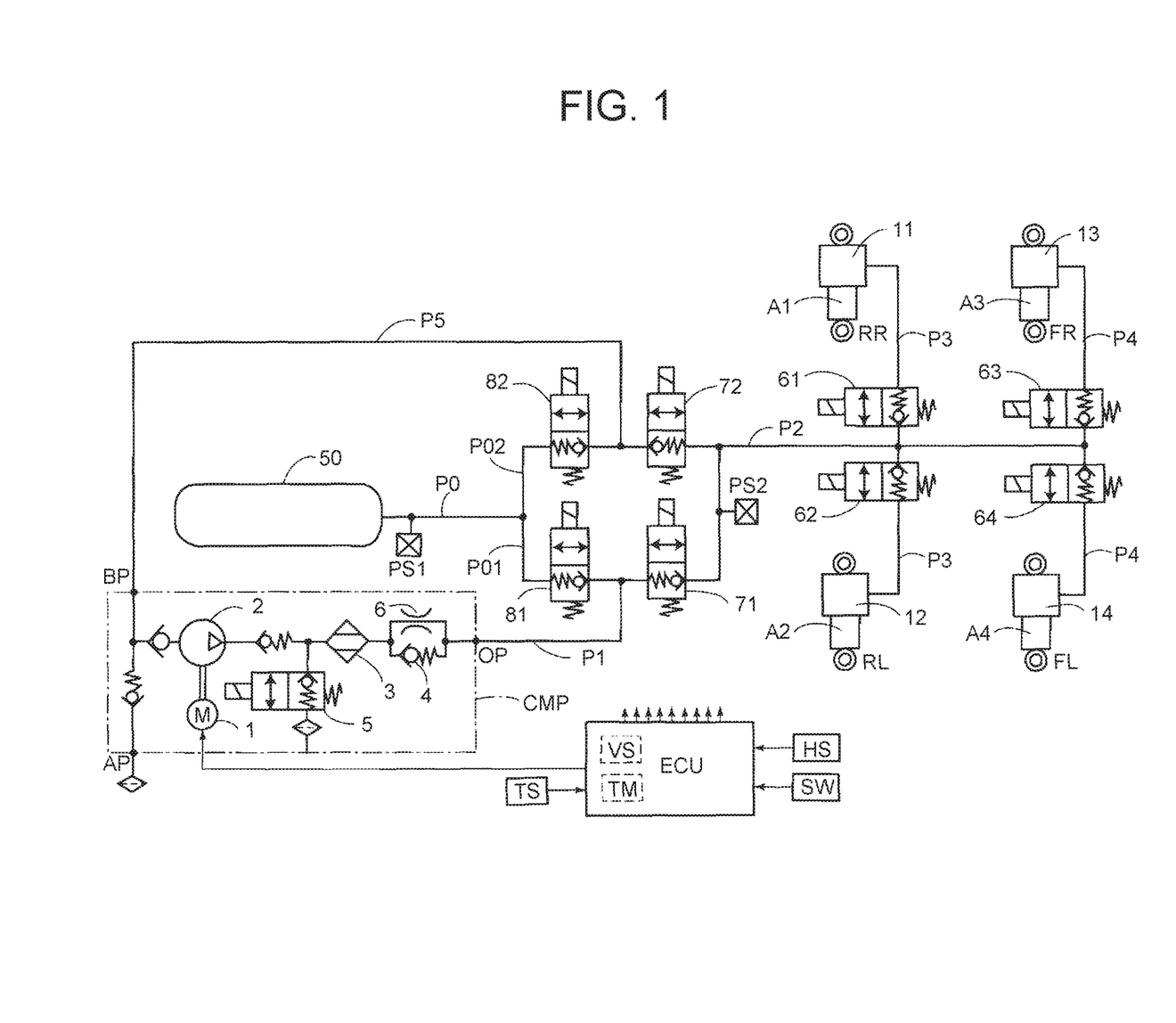
FIG. 1 is a block diagram of an overall configuration of an air suspension system according to one embodiment of the disclosure.

A description will hereinafter be made on a preferred embodiment of the disclosure with reference to the drawings. First, a description will be made on an overall configuration of an air suspension system of a closed type that pertains to one embodiment of the disclosure. In FIG. 1, a pressure accumulator tank 50 is disposed as an air-pressure supply source in the air suspension system. A compressor CMP is configured as represented in a one-dot chain line frame in FIG. 1. More specifically, the air suspension system includes: an electric motor 1 as a drive source; a pump 2 that converts rotary motion of this electric motor 1 to reciprocal motion of a piston in a cylinder, for example, so as to generate compressed air; and a dryer 3 that dries and discharges the compressed air generated by this pump 2. A normally-closed electromagnetic switching valve 5, which constitutes an air-discharge switching valve (a relief valve), is disposed in an air discharge path. A supply/discharge path P1 is provided with: a check valve 4 that permits airflow in a discharge direction and inhibits airflow in a reverse direction; and an orifice 6 that constantly communicates with the supply/discharge path P1 and is disposed in parallel with this check valve 4 via a throttle. Note that OP, BP, and AP respectively denote a discharge port, a back-pressure introduction port, and an atmospheric air suction port.

In addition, air spring devices A1 to A4, which respectively have air chambers 11 to 14, are respectively disposed in four wheels of a vehicle (a front right wheel, a front left wheel, a rear right wheel, and a rear left wheel are respectively denoted by FR, FL, RR, and RL, and only a support section of each of the wheels is shown in FIG. 1). The air chambers 11 to 14 communicate with the compressor CMP via the supply/discharge paths P1 to P4, respectively. In the supply/discharge paths P3, P4 that communicate with the air chambers 11 to 14, normally-closed electromagnetic switching valves 61 to 64 are disposed as control valves that respectively control a supply and discharge of the air to/from the air chambers 11 to 14.

The air spring devices A1 to A4 of this embodiment have: the rear-wheel side air chambers 11, 12 that are respectively attached to the wheels RR, RL in a rear portion of the vehicle; the front-wheel side air chambers 13, 14 that are respectively attached to the wheels FR, FL in a front portion of the vehicle; the rear-wheel side supply/discharge paths P3 that respectively communicate with the rear-wheel side air chambers 11, 12; and the front-wheel side supply/discharge paths P4 that respectively communicate with the front-wheel side air chambers 13, 14. The above control valves are configured by including: rear-wheel side control valves (the electromagnetic switching valves 61, 62) that are respectively disposed in the rear-wheel side supply/discharge paths P3; and front-wheel side control valves (the electromagnetic switching valves 63, 64) that respectively communicate with the front-wheel side supply/discharge paths P4. Except for a case where the front-wheel side and the rear-wheel side have to be particularly distinguished for a description, the front-wheel side and the rear-wheel side will not be distinguished in the following description like a case of the supply/discharge paths P3, P4.

Furthermore, in the supply/discharge path P1 between the electromagnetic switching valves 61 to 64 and the compressor CMP, a normally-closed electromagnetic switching valve 71 is disposed as a first supply/discharge switching valve that opens/closes the path P1. In a supply/discharge path P01 between the pressure accumulator tank 50 and the discharge port OP of the compressor CMP, an electromagnetic switching valve 81 is disposed as a first tank switching valve that opens/closes the path P01. Moreover, in a supply/discharge path P02 between the electromagnetic switching valves 61 to 64 and the pressure accumulator tank 50, an electromagnetic switching valve 72 as a second supply/discharge switching valve and an electromagnetic switching valve 82 as a second tank switching valve, each of which opens/closes the path P02, are disposed, and a portion between both of the electromagnetic switching valves is connected to the back-pressure introduction port BP of the compressor CMP via a circulation path P5. Note that the supply/discharge paths P01, P02 merge into a supply/discharge path P0 and thus will be described as the supply/discharge path P0 in the following description. In this embodiment, the electromagnetic switching valves 61 to 64, the electromagnetic switching valves 71, 72, and the electromagnetic switching valves 81, 82 are each constructed of a normally-closed solenoid valve of a so-called poppet type and are each configured to function as the relief valve at a closed position as represented by a symbol in each of the electromagnetic switching valves in FIG. 1. As will be described below, these electromagnetic switching valves 61 to 64, electromagnetic switching valves 71, 72, and electromagnetic switching valves 81, 82 are controlled to be opened/closed by a controller ECU. The controller ECU also controls driving of the electric motor 1 and the air spring devices A1 to A4 of the wheels.

In the compressor CMP, when the pump 2 is driven by the electric motor 1, the compressed dry air is discharged via the dryer 3 and the check valve 4. In addition, when the electric motor 1 is not driven, the electromagnetic switching valve 5 is at an open position. When the air is discharged via the orifice 6 and the dryer 3, a desiccant (not shown) in the dryer 3 is regenerated by the discharged air. Pressure sensors PS1, PS2 that respectively constitute the second and third measurement sections in the disclosure are respectively disposed in the supply/discharge paths P0, P2. These respectively detect pressure in the pressure accumulator tank 50 (tank pressure) and pressure in the supply/discharge path P2 (path pressure) and are each configured to supply a detection signal to the controller ECU.

Furthermore, the controller ECU is configured by including: a first measurement section TM that measures an elapsed period after a stop of the vehicle; and a fourth measurement section VS that measures a voltage for driving the electromagnetic switching valve 61 and the like. As will be described in detail below, the controller ECU executes first to third control, which will be described below, when it is determined that specified number of days or longer has elapsed since the stop of the vehicle, that the pressure in the pressure accumulator tank 50 exceeds specified tank pressure, and that the pressure in the supply/discharge path P2 is lower than specified path pressure on the basis of measurement results of the above first to fourth measurement sections. Note that, in this embodiment, a temperature sensor TS that detects temperatures around the electromagnetic switching valves 81, 82 is disposed as a fifth measurement section, for example. As shown in FIG. 1, it is configured that a detection signal of the temperature sensor TS is supplied to the controller ECU.

Hereinafter, a normal vehicle height adjustment operation in the air suspension system of this embodiment will be described before control before a travel start will be described. First, in a normal state, as shown in FIG. 1, each of the electromagnetic switching valves is at the closed position, the electric motor 1 is in an unoperated state (a stopped state), and each of the electromagnetic switching valves is controlled to be opened/closed by the controller ECU as will be described below in accordance with a detection signal of a vehicle height sensor HS, an operation of a manual switch SW, and the like. For example, in the cases where the controller ECU detects a vehicle height increase (elevation) command and detected pressure by the pressure sensor PS1 is equal to or higher than specified pressure K1, the electromagnetic switching valve 72, the electromagnetic switching valve 82, and the electromagnetic switching valves 61 to 64 are each switched to an open position, the compressed air in the pressure accumulator tank 50 is supplied to the air chambers 11 to 14 via the supply/discharge path P0 and the like, the air chambers 11 to 14 thereby expand, and vehicle height is consequently increased (elevated). When the vehicle height obtains a target vehicle height value, the electromagnetic switching valve 72, the electromagnetic switching valve 82, and the electromagnetic switching valves 61 to 64 are each switched to the closed position. When the detected pressure by the pressure sensor PS1 falls below specified pressure K2 in the meantime, the electromagnetic switching valve 71 is switched to the open position, the electric motor 1 is driven, and the compressed air is supplied from the discharge port OP to the supply/discharge path P2 until the vehicle height obtains the target vehicle height value.

Meanwhile, when a vehicle height reduction (lowering) command is detected in the state shown in FIG. 1, the electromagnetic switching valves 61 to 64, the electromagnetic switching valve 72, and the electromagnetic switching valve 81 are each switched to the open position, and the electric motor 1 is driven. In this way, the compressed air in the air chambers 11 to 14 is supplied to the pressure accumulator tank 50 via the supply/discharge path P2, the circulation path P5, the pump 2, the dryer 3, the check valve 4, and the electromagnetic switching valve 81, the air chambers 11 to 14 thereby shrink, the vehicle height is consequently reduced (lowered), and the pressure accumulator tank 50 accumulates the pressure. Then, when the vehicle height obtains the target vehicle height value, the electric motor 1 is stopped, and the electromagnetic switching valves 61 to 64, the electromagnetic switching valve 72, and the electromagnetic switching valve 81 are each switched to the closed position.

When the desiccant (not shown) in the dryer 3 has to be regenerated irrespective of the above vehicle height adjustment operation or the like, the electromagnetic switching valve 81 and the electromagnetic switching valve 5 are each switched to the open position, the dry air in the pressure accumulator tank 50 is discharged via the orifice 6 and the dryer 3, and the desiccant (not shown) in the dryer 3 is regenerated during discharging of this air. Thereafter, the electromagnetic switching valve 5 is returned to the closed position. When the electric motor 1 is driven, atmospheric air is suctioned from the atmospheric air suction port AP, and the compressed air, which is generated by the pump 2, is supplied to the pressure accumulator tank 50 from the discharge port OP via the electromagnetic switching valve 81 at the open position. Then, when the detected pressure by the pressure sensor PS1 becomes equal to or higher than specified pressure K3, the electromagnetic switching valve 81 is switched to the closed position, the electric motor 1 is stopped, and the pressure accumulator tank 50 is returned to a high-pressure retention state.

Here, in the system shown in FIG. 1, it is assumed that pressure (set as P0$x$) in the supply/discharge path P0 corresponding to the pressure in the pressure accumulator tank 50 fluctuates between a maximum value 1.7 MPa (megapascal) and a minimum value 0.5 MPa, for example. Similarly, it is assumed that pressure (set as P3$x$) in the rear-wheel side supply/discharge path P3 fluctuates between a maximum value 0.8 MPa and a minimum value 0.4 MPa and that pressure (set as P4$x$) in the front-wheel side supply/discharge path P4 fluctuates between a maximum value 1.0 MPa and a minimum value 0.6 MPa. In addition, it is assumed that pressure (set as P2$x$) in the supply/discharge path P2, pressure (P5$x$) in the circulation path P5, and pressure (set as P1$x$) in the supply/discharge path P1 each fluctuate between a maximum value 1.7 MPa and a minimum value 0 MPa. At this time, pressure that is required to open each of the electromagnetic switching valves (required valve opening pressure) is a maximum value of a pressure difference of the path before and after each of the electromagnetic switching valves, that is, a difference between the maximum pressure value and the minimum pressure value of the path before and after each of the electromagnetic switching valves. Thus, the required valve opening pressure for the electromagnetic switching valves 61, 62 is 0.8 MPa (a difference between the maximum value 0.8 MPa of P3$x$ and the minimum value 0 MPa of P2$x$), and the required valve opening pressure for the electromagnetic switching valves 63, 64 is 1.0 MPa (a difference between the maximum value 1.0 MPa of P4$x$ and the minimum value 0 MPa of P2$x$). Meanwhile, the required valve opening pressure for the electromagnetic switching valves 71, 72 and the electromagnetic switching valves 81, 82 is 1.7 MPa as high pressure (a difference between the maximum pressure value 1.7 MPa and the minimum pressure value 0 MPa of the path before and after each of the electromagnetic switching valves).

Figure 5:
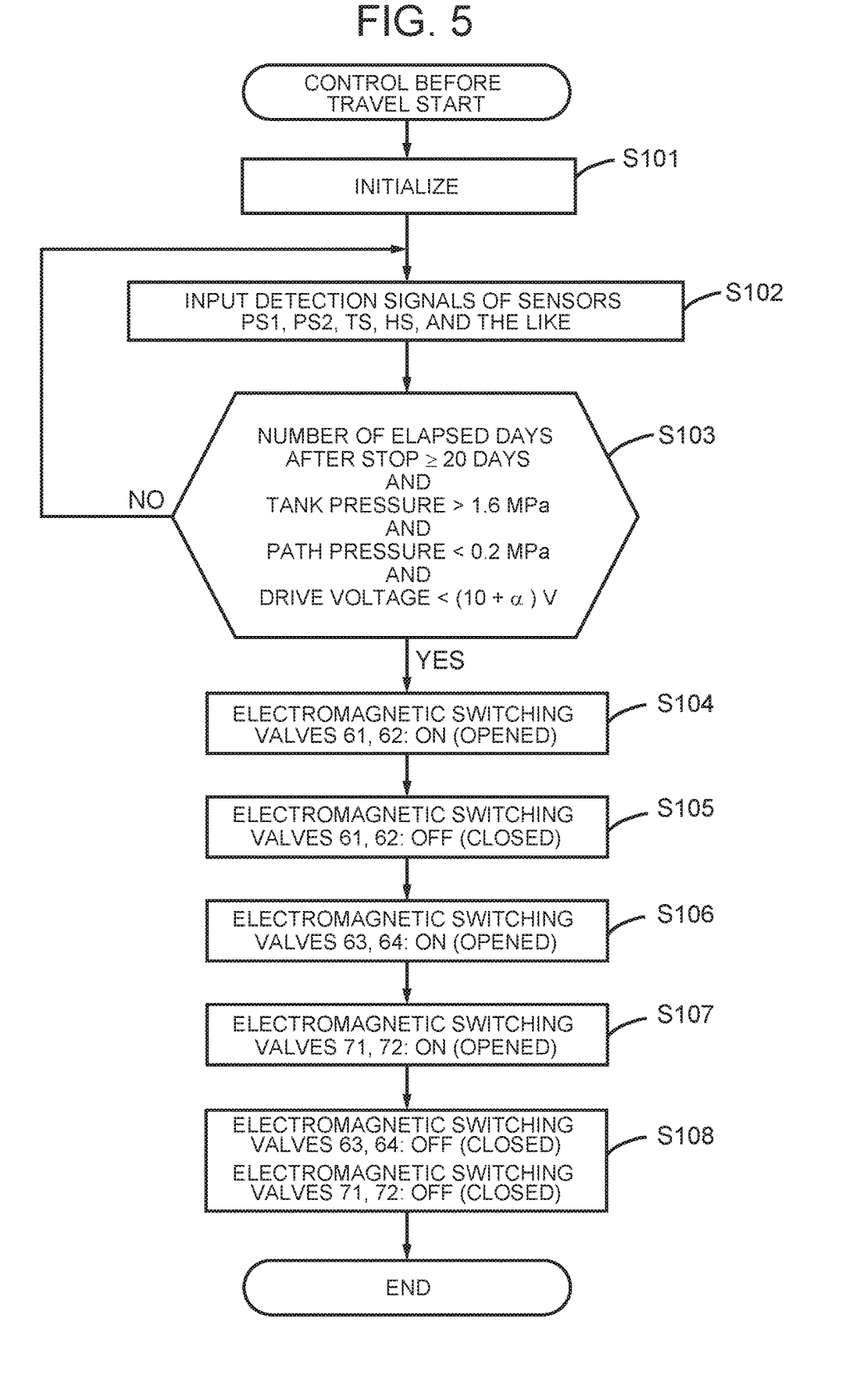
FIG. 5 is a flowchart of the control before the travel start according to the one embodiment of the disclosure.

In order to reduce the required valve opening pressure for each of the above electromagnetic switching valves, in this embodiment, as shown in FIG. 5, the controller ECU executes the control before the travel start. Before the travel start, as shown in FIG. 1, the electromagnetic switching valve 61 and the like are each switched to the closed position, and the compressor CMP is in an off state. First, in step S101 shown in FIG. 5, the system is initialized. Next, the process proceeds to step S102. The detection signals of the pressure sensors PS1, PS2, the temperature sensor TS, the vehicle height sensor HS, and the like are read, and required signals are also read via a communication bus. Next, in step S103, necessity of the control before the travel start is determined on the basis of these signals.

More specifically, in step S103, the control before the travel start "can be executed" if it is determined that the specified number of days (for example, 20 days) or longer has elapsed since the vehicle stop on the basis of the measurement result of the first measurement section TM, it is determined that the pressure in the pressure accumulator tank 50 exceeds the specified tank pressure (for example, 16 MPa) on the basis of the detection result of the pressure sensor PS1, it is determined that the pressure in the supply/discharge path P2 is lower than the specified path pressure (for example, 2 MPa) on the basis of the detection result of the pressure sensor PS2, and it is determined that the voltage for driving the electromagnetic switching valve 61 and the like is lower than a specified reference voltage (for example, (10+α) V) on the basis of a measurement result of the voltage measurement section VS. Then, the above reading and determinations are repeated until all of the above conditions are satisfied. In this way, the necessity of the control before the travel start can reliably be determined. Note that, in regard to whether the vehicle is stopped, it is determined that the vehicle is in a stopped state if an ignition switch (not shown) is in an off state and/or if a wheel speed is zero (0) and a shift position signal of the vehicle is parking (P) or neutral (N).

The above "α" of the reference voltage is set in accordance with the detection result of the temperature sensor TS. For example, when the detection result is 80° C., 0.5 V is added to a base voltage 10 V as "α", and thus the reference voltage is set at 10.5 V. When the detection result is 30° C., 0.2 V is added to the base voltage 10 V as "α", and thus the reference voltage is set at 10.2 V. When the detection result is 0° C., the base voltage 10 V is set as the reference voltage. In this way, a change in the required voltage to drive each of the electromagnetic switching valves, which is associated with a temperature change, is appropriately handled, and thus the necessity of the control before the travel start can further reliably be determined. Here, it may be configured that the above "α" is set in accordance with the detection results of the above pressure sensors P51, PS2 and that the reference voltage is increased as a pressure difference between the tank pressure and the path pressure is increased, for example.

Figure 2:
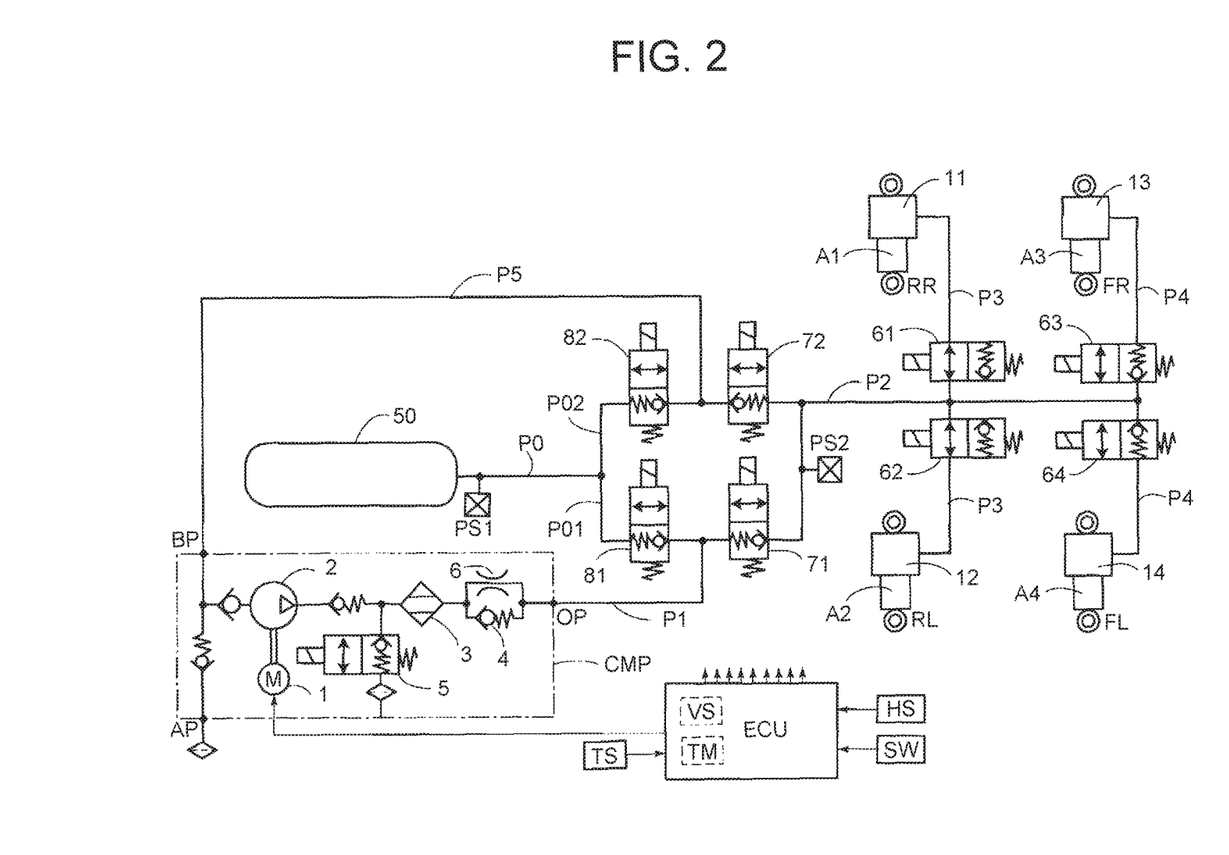
FIG. 2 is a block diagram that illustrates a state under rear-wheel side control as a part of first control in control before a travel start of the air suspension system according to the one embodiment of the disclosure.

If all of the above conditions are satisfied in step S103 and it is thus determined that the control before the travel state "can be executed", the process proceeds to step S104. Then, the electromagnetic switching valves 61, 62 as the rear-wheel side control valves are turned on and switched to the open positions as shown in FIG. 2. The required valve opening pressure for the electromagnetic switching valves 61, 62 at this time is differential pressure (0.8−0=0.8 MPa) between the maximum value (P3x(max)=0.8 MPa) of the pressure (P3x) in the rear-wheel side supply/discharge path P3 and the minimum value (P2x(min)=0 MPa) of the pressure (P2x) in the supply/discharge path P2. As a result of switching of the electromagnetic switching valves 61, 62 to the open positions, the pressure in each of the supply/discharge paths (P3, P2) between the rear-wheel side control valves (61, 62) and the first and second supply/discharge switching valves (71, 72) equals pressure in each of the rear-wheel side air chambers (11, 12). That is, the pressure in each of the supply/discharge paths (P3, P2) obtains a pressure value between the maximum value (P3x(max)=0.8 MPa) and the minimum value (P3x(min)=0.4 MPa) of the pressure (P3x) in the rear-wheel side supply/discharge path P3. In this state, the electromagnetic switching valves 61, 62 are turned off in step S105 and are switched to the closed positions in FIG. 1. Then, rear-wheel side control that constitutes the first control of the disclosure is completed by above steps S104 and S105.

Figure 3:
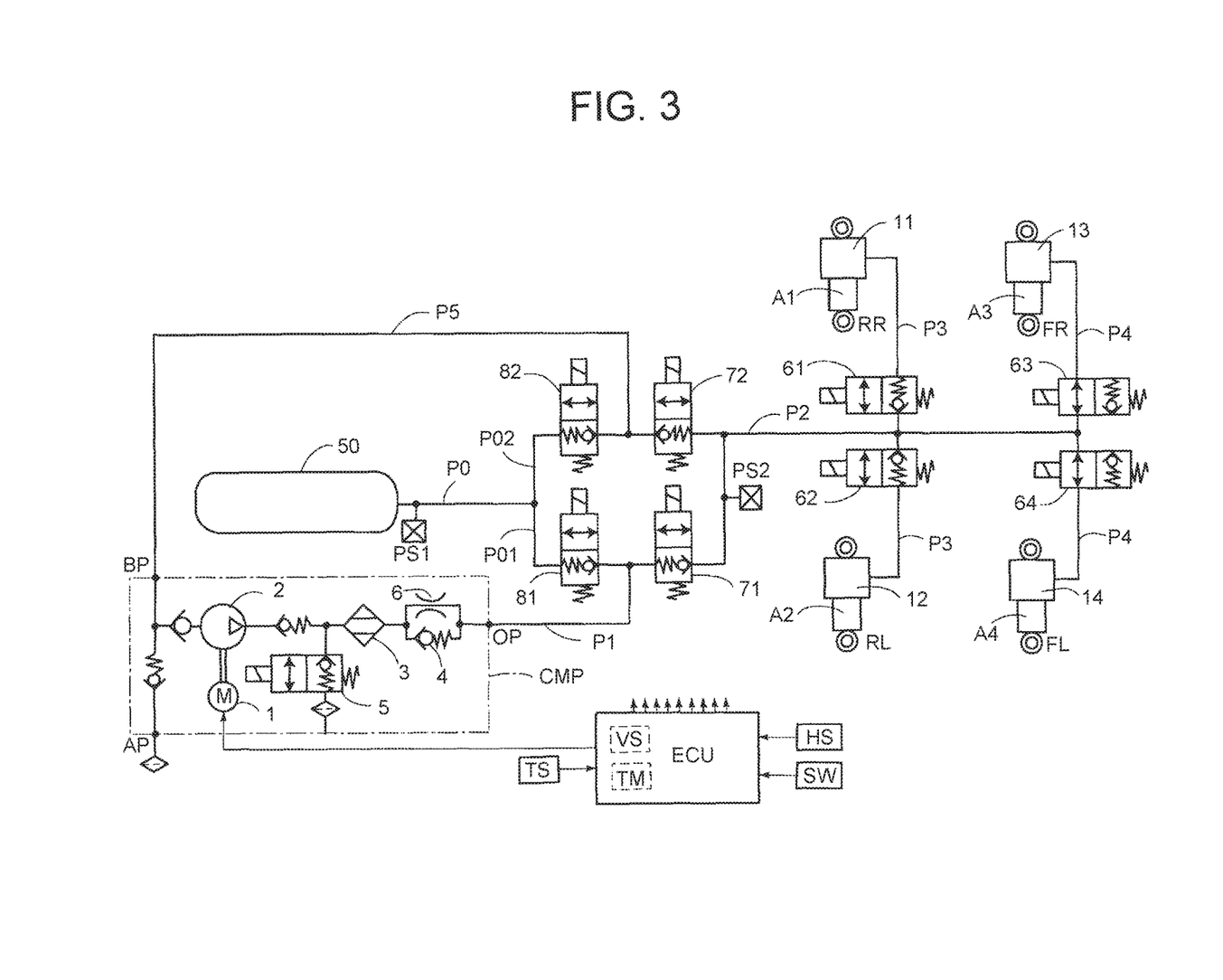
FIG. 3 is a block diagram of a state under front-wheel side control as a part of the first control in the control before the travel start of the air suspension system according to the one embodiment of the disclosure.

Next, the process proceeds to step S106. The electromagnetic switching valves 63, 64 as the front-wheel side control valves are turned on and switched to the open positions as shown in FIG. 3. The required valve opening pressure for the electromagnetic switching valves 63, 64 at this time is differential pressure (1.0−0.4=0.6 MPa) between the maximum value (P4x(max)=1.0 MPa) of the pressure (P4x) in front-wheel side supply/discharge path P4 and the minimum value (P2x(min)=0.4 MPa in above step S104) of the pressure (P2x) in the supply/discharge path P2. As a result of switching of the electromagnetic switching valves 63, 64 to the open positions, the pressure in each of the supply/discharge paths (P4, P2) between the front-wheel side control valves (63, 64) and the first and second supply/discharge switching valves (71, 72) equals pressure in each of the front-wheel side air chambers (13, 14). That is, the pressure in each of the supply/discharge paths (P4, P2) obtains a pressure value between the maximum value (P4x(max)=1.0 MPa) and the minimum value (P4x(min)=0.6 MPa) of the pressure (P4x) in the front-wheel side supply/discharge path P4. Then, front-wheel side control that constitutes the first control of the disclosure is completed by step S106. That is, the front-wheel side control is executed after the rear-wheel side control, and the first control of the disclosure is executed by steps S104 to S106.

Figure 4:
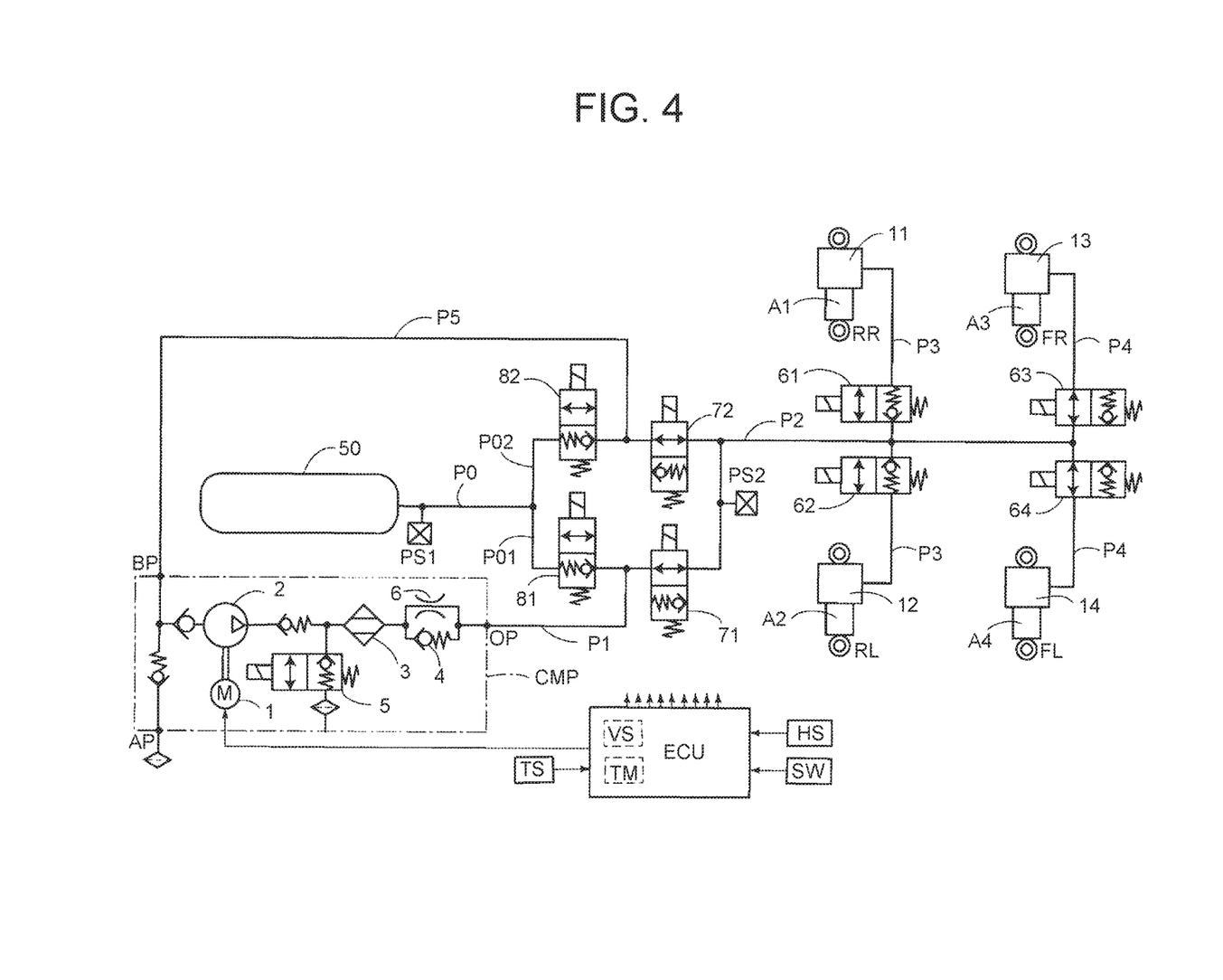
FIG. 4 is a block diagram of a state under second control in the control before the travel start of the air suspension system according to the one embodiment of the disclosure.

The process further proceeds to step S107. The electromagnetic switching valves 71, 72 that constitute the first and second supply/discharge switching valves are turned on and switched to the open positions as shown in FIG. 4. The required valve opening pressure for the electromagnetic switching valve 72 at this time is differential pressure (1.0−0=1.0 MPa) between the maximum value (P2x(max)=1.0 MPa) of the pressure (P2x) in the supply/discharge path P2 and the minimum value (P5x(min)=0 MPa) of the pressure (P5x) in the circulation path P5. Meanwhile, the required valve opening pressure for the electromagnetic switching valve 71 is differential pressure (1.7−0.6=1.1 MPa) between the maximum value (P1x(max)=1.7 MPa) of the pressure (P1x) in the supply/discharge path P1 and the minimum value (P2x(min)=P4x(min)=0.6 MPa in step S106) of the pressure (P2x) in the supply/discharge path P2 at this time. As a result of this, the pressure in each of the supply/discharge paths (P2, P5, P1) obtains a pressure value between the maximum value (P2x(max)=1.0 MPa) and the minimum value (P2x(min)=0.6 MPa) of the pressure (P2x) in the supply/discharge path P2. Then, the second control of the disclosure is completed by step S107.

Then, in step S108, the electromagnetic switching valves 63, 64 as the front-wheel side control valves are turned off (to the closed position), and the electromagnetic switching valves 71, 72 that constitute the first and second supply/discharge switching valves are turned off (to the closed position) and brought into the states shown in FIG. 1. Then, the third control of the disclosure is completed, and the control before the travel start is terminated. After the termination of the control, the required valve opening pressure for the electromagnetic switching valves 61, 62 is reduced to 0.2 MPa, the required valve opening pressure for the electromagnetic switching valves 63, 64 is reduced to 0 MPa, the required valve opening pressure for the electromagnetic switching valves 71, 72 is reduced to 0 MPa, and the required valve opening pressure for the electromagnetic switching valves 81, 82 is reduced to 1.1 MPa.

The required valve opening pressure for each of the electromagnetic switching valves in the control before the travel start including the processes in above steps S104 to S108 is reduced as follows. More specifically, the required valve opening pressure for the electromagnetic switching valves 61, 62 becomes 0.8 MPa, the required valve opening pressure for the electromagnetic switching valves 63, 64 becomes 0.6 MPa, the required valve opening pressure for the electromagnetic switching valve 71 becomes 1.1 MPa, the required valve opening pressure for the electromagnetic switching valve 72 becomes 1.0 MPa, and the required valve opening pressure for the electromagnetic switching valves 81, 82 becomes 1.1 MPa. As a result of this, the valve opening pressure for the electromagnetic switching valves 61, 62 is reduced by (1.0−0.8=) 0.2 MPa. The valve opening pressure for the electromagnetic switching valve 71 and the electromagnetic switching valves 81, 82 is reduced by (1.7−1.1=) 0.6 MPa.

Note that the first control may be configured by including the front-wheel side control in step S106 only by eliminating steps S104 and S105 shown in FIG. 5 and the controller ECU may execute the control before the travel start in accordance with steps S106 to S108.

What is claimed is:

1. An air suspension system comprising:
   an air spring device that is attached to each wheel of a vehicle and has an air chamber;
   a compressor that has a discharge port and a back-pressure introduction port, compresses air, and discharges the compressed air from the discharge port;
   a pressure accumulator tank that accumulates the air;
   a control valve that is disposed in a supply/discharge path through which the discharge port of the compressor communicates with the air chamber;
   a first tank switching valve that is disposed in a supply/discharge path between the pressure accumulator tank and the discharge port of the compressor;
   a first supply/discharge switching valve that is disposed in a supply/discharge path between the first tank switching valve and the control valve;
   a second supply/discharge switching valve that is disposed in a supply/discharge path between the control valve and the pressure accumulator tank;
   a second tank switching valve that is disposed in a supply/discharge path between the second supply/discharge switching valve and the pressure accumulator tank;
   a circulation path through which a portion between the second supply/discharge switching valve and the second tank switching valve communicates with the back-pressure introduction port of the compressor; and
   a controller that controls opening/closing of normally-closed electromagnetic switching valves that constitute the control valve, the first supply/discharge switching valve, the second supply/discharge switching valve, the first tank switching valve, and the second tank switching valve, wherein
   the air suspension system adjusts vehicle height by controlling a supply/discharge of the air to/from the air spring device, and
   the controller controls opening/closing of each of the electromagnetic switching valves in an order of first control, second control, and third control, in the first control, the control valve being opened such that pressure in a supply/discharge path between the control valve and each of the first supply/discharge switching valve and the second supply/discharge switching valve equals pressure in the air chamber, in the second control, the first supply/discharge switching valve and the second supply/discharge switching valve being opened in an opened state of the control valve such that pressure before each of the first supply/discharge switching valve and the second supply/discharge switching valve equals pressure after each thereof, and in the third control, the control valve, the first supply/discharge switching valve, and the second supply/discharge switching valve being closed.

2. The air suspension system according to claim 1, wherein
   the air spring device has: a front-wheel side air chamber that is attached to each of the wheels in a front portion of the vehicle; a rear-wheel side air chamber that is attached to each of the wheels in a rear portion of the vehicle; a front-wheel side supply/discharge path that communicates with each of the front-wheel side air chambers; and a rear-wheel side supply/discharge path that communicates with each of the rear-wheel side air chambers,
   the control valve has: a front-wheel side control valve that is attached to each of the front-wheel side supply/discharge paths; and a rear-wheel side control valve that communicates with each of the rear-wheel side supply/discharge paths, and
   the first control by the controller is configured by including: rear-wheel side control in which the rear-wheel side control valve is opened such that the pressure in the supply/discharge path between the rear-wheel side control valve and each of the first supply/discharge switching valve and the second supply/discharge switching valve equals pressure in the rear-wheel side air chamber; and front-wheel side control in which the front-wheel side control valve is opened after the rear-wheel side control valve is closed such that the pressure in the supply/discharge path between the front-wheel side control valve and each of the first supply/discharge switching valve and the second supply/discharge switching valve equals pressure in the front-wheel side air chamber.

3. The air suspension system according to claim 1 further comprising:
   a first measurement section that measures an elapsed period after a stop of the vehicle;
   a second measurement section that measures pressure in the pressure accumulator tank; and
   a third measurement section that measures pressure in the supply/discharge path, wherein the controller executes the first to third control when specified number of days or longer has elapsed since the stop of the vehicle, the pressure in the pressure accumulator tank exceeds specified tank pressure, and the pressure in the supply/discharge path is lower than specified path pressure at least on the basis of measurement results of the first to third measurement sections.

4. The air suspension system according to claim 3 further comprising:
   a fourth measurement section that measures a voltage for driving the electromagnetic switching valves, wherein the controller executes the first to third control when the specified number of days or longer has elapsed since the stop of the vehicle, the pressure in the pressure accumulator tank exceeds the specified tank pressure, the pressure in the supply/discharge path is lower than the specified path pressure, and the voltage for driving the electromagnetic switching valves is lower than a specified voltage on the basis of measurement results of the first to fourth measurement sections.

5. The air suspension system according to claim 4 further comprising:
a fifth measurement section that measures temperatures around the electromagnetic switching valves, wherein the controller sets the specified voltage in accordance with a measurement result of the fifth measurement section.

* * * * *